(12) United States Patent  (10) Patent No.: US 8,605,301 B2
Kakoi et al.  (45) Date of Patent: Dec. 10, 2013

(54) IMAGE PROCESSING APPARATUS, IMAGE PROCESSING SYSTEM, AND COMPUTER PROGRAM PRODUCT

(75) Inventors: Akihiro Kakoi, Kanagawa (JP); Ryohta Kawamata, Kanagawa (JP); Satoru Ohno, Tokyo (JP); Naoya Ohhashi, Kanagawa (JP); Toshihiro Isozaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 165 days.

(21) Appl. No.: 13/103,450

(22) Filed: May 9, 2011

(65) Prior Publication Data

US 2011/0279847 A1  Nov. 17, 2011

(30) Foreign Application Priority Data

May 17, 2010  (JP) ................................. 2010-113495

(51) Int. Cl.
*G06K 15/00*  (2006.01)
(52) U.S. Cl.
USPC ......... 358/1.13; 358/1.9; 358/1.15; 358/1.16; 400/76
(58) Field of Classification Search
USPC ........... 358/1.5, 1.9, 1.13, 1.15–16, 296, 400, 358/404, 444, 504, 534; 400/61, 70, 76; 399/1
See application file for complete search history.

(56) References Cited

U.S. PATENT DOCUMENTS

| 5,287,194 | A | * | 2/1994 | Lobiondo | 358/296 |
|---|---|---|---|---|---|
| 5,873,659 | A | * | 2/1999 | Edwards et al. | 400/61 |
| 6,088,120 | A | * | 7/2000 | Shibusawa et al. | 358/1.15 |
| 6,552,818 | B1 | * | 4/2003 | Nakai et al. | 358/1.16 |
| 2002/0048476 | A1 | * | 4/2002 | Kato | 400/70 |
| 2003/0038964 | A1 | * | 2/2003 | Ferlitsch | 358/1.15 |
| 2004/0061896 | A1 | * | 4/2004 | Shimada | 358/1.15 |
| 2004/0070779 | A1 | * | 4/2004 | Ferlitsch | 358/1.13 |
| 2004/0125391 | A1 | * | 7/2004 | Zuber | 358/1.9 |
| 2004/0190057 | A1 | * | 9/2004 | Takahashi et al. | 358/1.15 |
| 2004/0252331 | A1 | * | 12/2004 | Wei | 358/1.15 |

(Continued)

FOREIGN PATENT DOCUMENTS

| JP | 10044561 | A | * | 2/1998 | ............... B41J 29/38 |
| JP | 3699210 | | | 7/2005 | |
| JP | 2009-53789 | | | 3/2009 | |
| JP | 2009053789 | A | * | 3/2009 | |

OTHER PUBLICATIONS

Hewlett-Packard, "HP Color LaserJet 5500 Printer Series—Selecting Accessory Options from the Printer Driver (PCL5c and PCL6 Driver)", Aug. 26, 2005.*

*Primary Examiner* — Houshang Safaipour
*Assistant Examiner* — Edwin S Leland, III
(74) *Attorney, Agent, or Firm* — Oblon, Spivak, McClelland, Maier & Neustadt, L.L.P.

(57) ABSTRACT

An image processing apparatus includes a reading unit, an acquiring unit, a transmission control unit, and a printing control unit. The reading unit reads images of multiple pages of originals. The acquiring unit acquires device information from connected child devices. The transmission control unit determines a child device which takes charge of part of a printing process of the read images and images to be transmitted to the child device based on the acquired device information, and transmits the determined images to the determined child device. The printing control unit determines printing order according to the acquired device information, and transmits an instruction to print the images in the determined printing order to the child device.

7 Claims, 15 Drawing Sheets

(56) References Cited

U.S. PATENT DOCUMENTS

| | | |
|---|---|---|
| 2005/0105128 A1* | 5/2005 | Konno .......................... 358/1.15 |
| 2006/0033956 A1* | 2/2006 | Takahashi .................... 358/1.15 |
| 2008/0063413 A1* | 3/2008 | Zuber ............................ 399/15 |
| 2008/0165379 A1* | 7/2008 | Zuber ............................ 358/1.9 |
| 2008/0309973 A1* | 12/2008 | Okamoto ..................... 358/1.15 |
| 2009/0109473 A1* | 4/2009 | Kato ............................. 358/1.15 |
| 2009/0164495 A1* | 6/2009 | MacLeod et al. ............. 707/102 |
| 2009/0244620 A1* | 10/2009 | Takahashi et al. ............ 358/1.15 |
| 2009/0268236 A1* | 10/2009 | Miyata ......................... 358/1.15 |
| 2010/0315672 A1* | 12/2010 | Suzuki ......................... 358/1.15 |
| 2011/0211893 A1* | 9/2011 | Shishido et al. ................ 400/76 |
| 2011/0255117 A1* | 10/2011 | Umeda ......................... 358/1.13 |
| 2011/0279847 A1* | 11/2011 | Kakoi et al. ................. 358/1.13 |
| 2012/0076560 A1* | 3/2012 | Noguchi et al. ................ 400/76 |
| 2012/0206764 A1* | 8/2012 | Fujii ............................ 358/1.15 |
| 2013/0050748 A1* | 2/2013 | Tsuchitoi ..................... 358/1.15 |

\* cited by examiner

FIG.12

| PATTERN NO. | CONFIGURATIONS | | | TRANSMISSION ORDER & PRINT INSTRUCTION | | |
|---|---|---|---|---|---|---|
| | DISCHARGE TYPE | PRESENCE OR ABSENCE OF HDD | PRESENCE OR ABSENCE OF DUPLEX PRINTING MECHANISM | IMAGE TRANSMISSION ORDER | PRINTING ORDER | PRESENCE OR ABSENCE OF REVERSAL BY DUPLEX PRINTING MECHANISM |
| 1 | FACEUP | PRESENCE | PRESENCE | READ ORDER | NORMAL ORDER | PRESENCE |
| 2 | FACEUP | PRESENCE | ABSENCE | READ ORDER | REVERSE ORDER | - |
| 3 | FACEUP | ABSENCE | PRESENCE | READ ORDER | NORMAL ORDER | PRESENCE |
| 4 | FACEUP | ABSENCE | ABSENCE | REVERSE ORDER | NORMAL ORDER | - |
| 5 | FACEDOWN | PRESENCE | PRESENCE | READ ORDER | NORMAL ORDER | ABSENCE |
| 6 | FACEDOWN | PRESENCE | ABSENCE | READ ORDER | NORMAL ORDER | - |
| 7 | FACEDOWN | ABSENCE | PRESENCE | READ ORDER | NORMAL ORDER | ABSENCE |
| 8 | FACEDOWN | ABSENCE | ABSENCE | READ ORDER | NORMAL ORDER | - |

IMAGE PROCESSING APPARATUS, IMAGE PROCESSING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2010-113495 filed in Japan on May 17, 2010.

BACKGROUND OF THE INVENTION

1. Field of the Invention

The present invention relates to an image processing apparatus, an image processing system, and a computer program product.

2. Description of the Related Art

Conventionally, there is already known a distributed printing technology to distribute printing of multiple pages of originals to a plurality of multifunction peripherals (MFPs) connected to a network to increase the print speed.

However, in the conventional distributed printing technology, if MFPs used in distributed printing are not uniform in specs, there is a program that it is troublesome to merge printed sheets collected from the MFPs in the same direction. For example, in a case of a mixture of a face-up discharge type of MFP which discharges a printed sheet with the printed side up and a face-down discharge type of MFP which discharges a printed sheet with the printed side down or a case of a mixture of an MFP equipped with a nonvolatile memory such as an HDD for storing image data to be printed and an MFP equipped with no nonvolatile memory, the printed side of printed sheets or the printing order is not unified.

To cope with this problem, there is proposed a method to conform the order of pages of printed sheets to the order of pages of originals if multiple types of copiers or scanners are connected to a network and they differ in a discharge function and an original scanning function (for example, Japanese Patent Application Laid-open No. 2009-53789). Japanese Patent Application Laid-open No. 2009-53789 discloses a method to determine the read order of an image reading unit and select face-down discharge if the image reading unit reads images of originals from the first page or face-up discharge if the image reading unit reads images of originals from the last page.

However, the technology disclosed in Japanese Patent Application Laid-open No. 2009-53789 is based on the premise that one device performs printing, so in a case of distributed printing with a plurality of devices, the printed side or the printing order cannot be unified.

SUMMARY OF THE INVENTION

It is an object of the present invention to at least partially solve the problems in the conventional technology.

According to an aspect of the present invention, there is provided an image processing apparatus connected to one or a plurality of second image processing apparatuses, the image processing apparatus including: a reading unit that reads images of multiple pages of originals; an acquiring unit that acquires device information from the connected second image processing apparatuses; a transmission control unit that determines a second image processing apparatus which takes charge of part of a printing process of the read images and images to be transmitted to the second image processing apparatus based on the acquired device information, and transmits the determined images to the determined second image processing apparatus; and a printing control unit that determines printing order according to the acquired device information, and transmits an instruction to print the images in the determined printing order to the second image processing apparatus.

According to another aspect of the present invention, there is provided an image processing system including a first image processing apparatus and one or a plurality of second image processing apparatuses which takes charge of part of a printing process of the first image processing apparatus, wherein the first image processing apparatus includes: a reading unit that reads images of multiple pages of originals; an acquiring unit that acquires device information from the connected second image processing apparatus; a transmission control unit that determines the second image processing apparatus which takes charge of part of a printing process of the read images and images to be transmitted to the second image processing apparatus based on the acquired device information, and transmits the determined images to the determined second image processing apparatus; and a printing control unit that determines printing order according to the acquired device information, and transmits an instruction to print the images in the determined printing order to the second image processing apparatus, and the second image processing apparatuses include: a reception control unit that receives the images and the instruction from the first image processing apparatus; and a printing unit that prints out the received images in accordance with the instruction.

According to still another aspect of the present invention, there is provided a computer program product including a non-transitory computer-readable medium having computer-readable program codes for processing an image performed by an image processing apparatus connected to one or a plurality of second image processing apparatuses that includes a reading unit, an acquiring unit, a transmission control unit, and a printing control unit the program codes when executed causing the image processing apparatus to execute: reading, by the reading unit, images of multiple pages of originals; acquiring, by the acquiring unit, device information from the connected second image processing apparatuses; determining, by the transmission control unit, a second image processing apparatus which takes charge of part of a printing process of the read images and images to be transmitted to the second image processing apparatus based on the acquired device information, and transmitting, by the transmission control unit, the determined images to the determined second image processing apparatus; and determining, by the printing control unit, printing order according to the acquired device information, and transmitting, by the printing control unit, an instruction to print the images in the determined printing order to the second image processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a diagram showing an example of a print instruction table;

DETAILED DESCRIPTION OF THE PREFERRED EMBODIMENTS

Exemplary embodiments of an image processing apparatus, an image processing system, and a computer program product according to the present invention are explained in detail below with reference to the accompanying drawings.

First Embodiment

Figure 1:
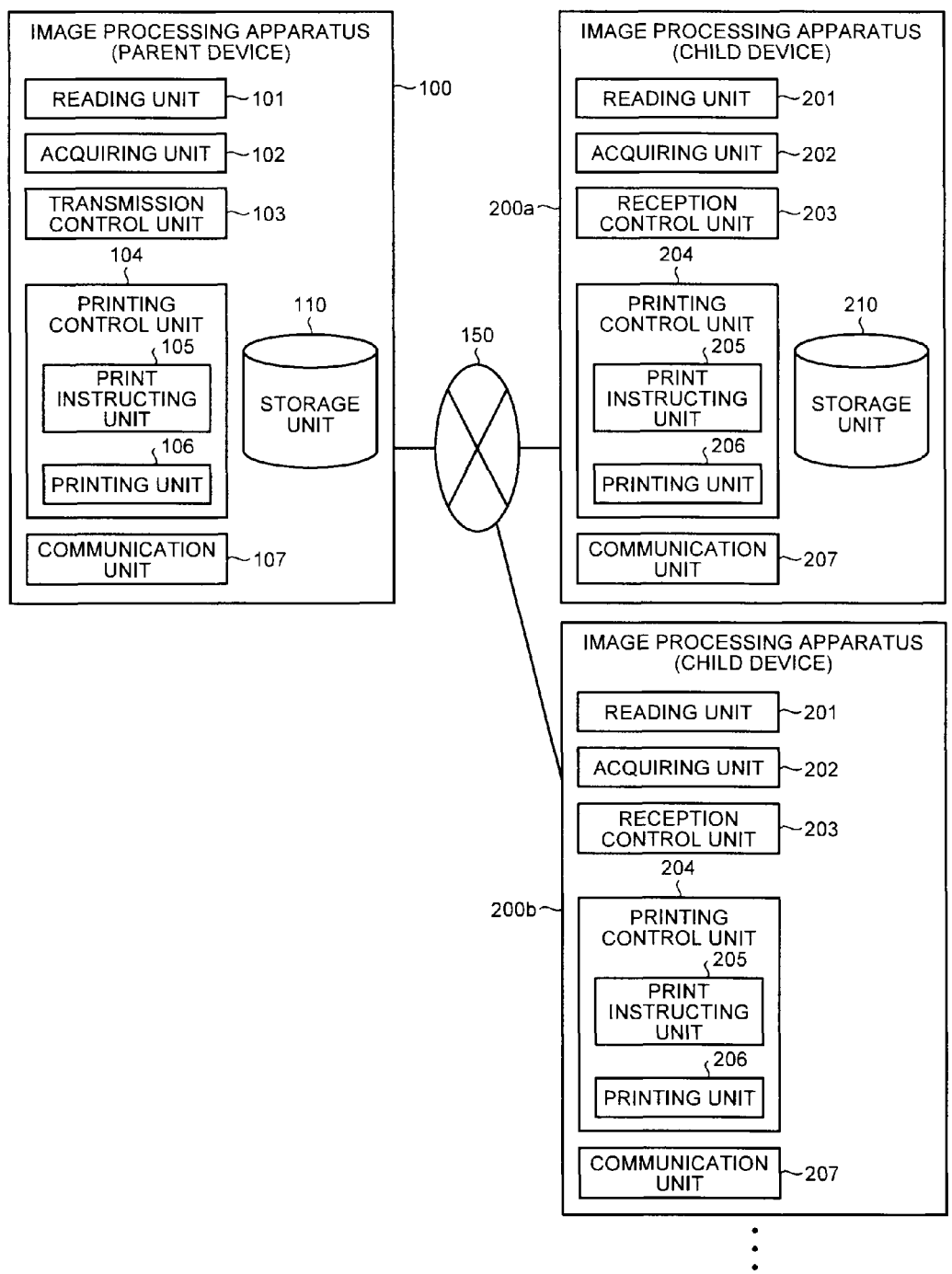
FIG. 1 is a configuration diagram of an entire image processing system according to a first embodiment.

FIG. 1 is a block diagram showing an entire configuration and functions of an image processing system according to a first embodiment. As shown in FIG. 1, an image processing apparatus which is a parent device (hereinafter, referred to as a "parent device") 100 is connected to image processing apparatuses which are child devices (hereinafter, referred to as "child devices") 200a and 200b (hereinafter, collectively referred to as "child device(s) 200" unless otherwise specified) via a communication device 150. Incidentally, in FIG. 1, two child devices 200 are illustrated; however, the number of child devices is not limited to two, and one or a plurality of child devices is connected to the parent device 100.

First, the parent device 100 mainly includes a reading unit 101, an acquiring unit 102, a transmission control unit 103, a printing control unit 104, a communication unit 107, and a storage unit 110.

The reading unit 101 reads an image of an original with a scanner (not shown), and stores the read image in the storage unit 110. Here, the reading unit 101 reads images of a batch of multiple pages of originals subject to distributed printing. The communication unit 107 communicates with the child devices 200 via the communication device 150, and transmits and receives various information. Incidentally, the communication device 150 is an external interface (not shown) or the like.

The storage unit 110 stores therein device information of the parent device 100. The device information here means information on configurations of hardware included in the parent device 100. For example, the device information includes the discharge order of printed sheets, the presence or absence of a duplex conveying device, the presence or absence of a hard disk drive (HDD), and a printing ability indicating the print processing speed, etc.

The acquiring unit 102 acquires the device information of the parent device 100 from the storage unit 110. Furthermore, the acquiring unit 102 acquires device information of a child device 200 from a storage unit 210 of the child device 200 to be described later via the communication unit 107.

The transmission control unit 103 determines a cooperating child device 200 depending on the printing ability included in the device information acquired by the acquiring unit 102. The cooperating child device here means a child device which takes charge of part of a printing job of the images read by the reading unit 101 in cooperation with the parent device 100.

The transmission control unit 103 determines the number of images to be printed by the parent device 100 and the number of images that the determined cooperating child device 200 is assigned to print according to their printing abilities included in the device information acquired by the acquiring unit 102, and transmits the determined images to the cooperating child device 200.

The transmission control unit 103 determines the transmission order in which the images are transmitted to the cooperating child device 200, and transmits the images to the cooperating child device 200 in the determined order. For example, the transmission control unit 103 determines whether the cooperating child device 200 is a face-up discharge type from the device information of the cooperating child device 200. When determining that the cooperating child device 200 is not a face-up discharge type, the transmission control unit 103 transmits the images to the cooperating child device 200 in the read order. On the other hand, when determining that the cooperating child device 200 is a face-up discharge type, the transmission control unit 103 transmits the images to the cooperating child device 200 in reverse order to the read order.

The printing control unit 104 controls a printing process in the parent device 100 and a printing process in the cooperating child device 200. The printing control unit 104 includes a print instructing unit 105 and a printing unit 106.

The print instructing unit 105 determines whether the parent device 100 is a face-up discharge type based on the acquired device information. When determining that the parent device 100 is a face-up discharge type, the print instructing unit 105 transmits an instruction to print images of originals in the order in which the images are read by the reading unit 101 (hereinafter, referred to as "the read order") to the printing unit. On the other hand, when determining that the parent device 100 is not a face-up discharge type, the print instructing unit 105 transmits an instruction to print images of originals in reverse order to the read order to the printing unit.

Furthermore, the print instructing unit 105 determines the order in which images read by the reading unit 101 are transmitted to the cooperating child device 200 (hereinafter, referred to as "the transmission order"), and transmits the images to the cooperating child device 200 in the determined order. Or the print instructing unit 105 can give an instruction on the printing order of already-transmitted images to the cooperating child device 200. The printing unit 106 prints out the images in the printing order given by the print instructing unit 105.

Then, the child device 200 mainly includes a reading unit 201, an acquiring unit 202, a reception control unit 203, a printing control unit 204, a communication unit 207, and a storage unit 210. Incidentally, the child device 200a shown in FIG. 1 includes the storage unit 210; however, the child device 200 does not have to include a storage unit like the child device 200b.

The reading unit 201 reads an image of an original from a scanner (not shown). The storage unit 210 stores therein device information of the child device 200. The communication unit 207 communicates with the parent device 100 via the communication device 150, and transmits and receives various information.

The acquiring unit 202 acquires the device information of the child device 200 from the storage unit 210 in response to a request from the parent device 100, and transmits the acquired device information to the parent device 100 via the communication unit 207.

The reception control unit 203 receives images to be printed and an instruction on the printing order from the parent device 100 via the communication unit 207, and stores the received images in the storage unit 210. Incidentally, if the child device 200 does not include the storage unit 210, the reception control unit 203 transmits the received images to the printing control unit 204.

The printing control unit 204 prints out the images to be printed from the reception control unit 203. The printing control unit 204 includes a print instructing unit 205 and a printing unit 206. The print instructing unit 205 receives a print instruction from the parent device 100, and transmits the received print instruction to the printing unit 206. The print instruction here is either an instruction to print images in the order in which the reception control unit 203 has received the images to be printed from the parent device 100 or an instruction to print the images in reverse order to the received order. The printing unit 206 receives a print instruction from the print instructing unit 205, and prints out images to be printed in accordance with the received print instruction.

Figure 2:
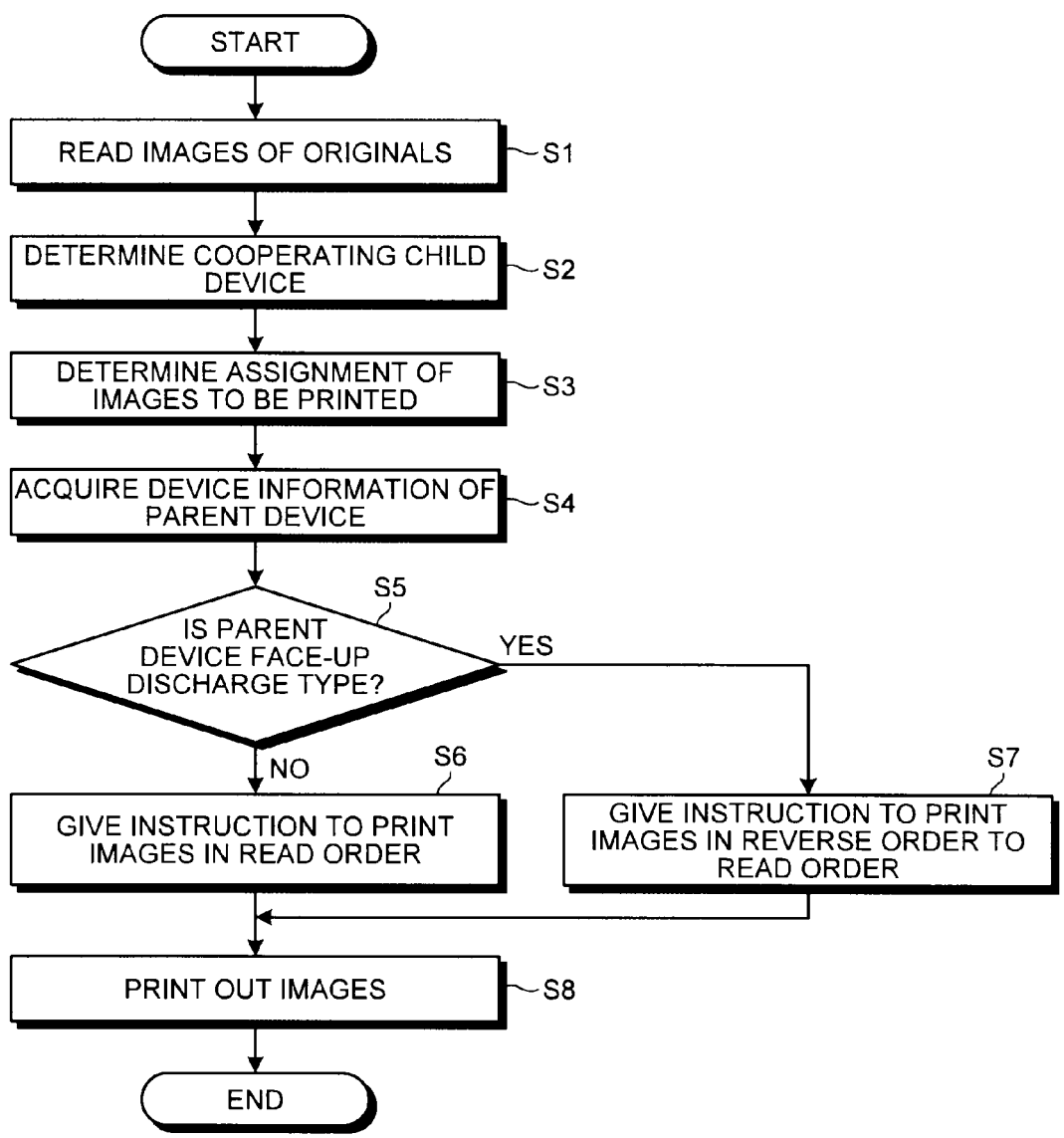
FIG. 2 is a flowchart showing a procedure of how a parent device gives itself a print instruction and performs a printing process.
Figure 3:
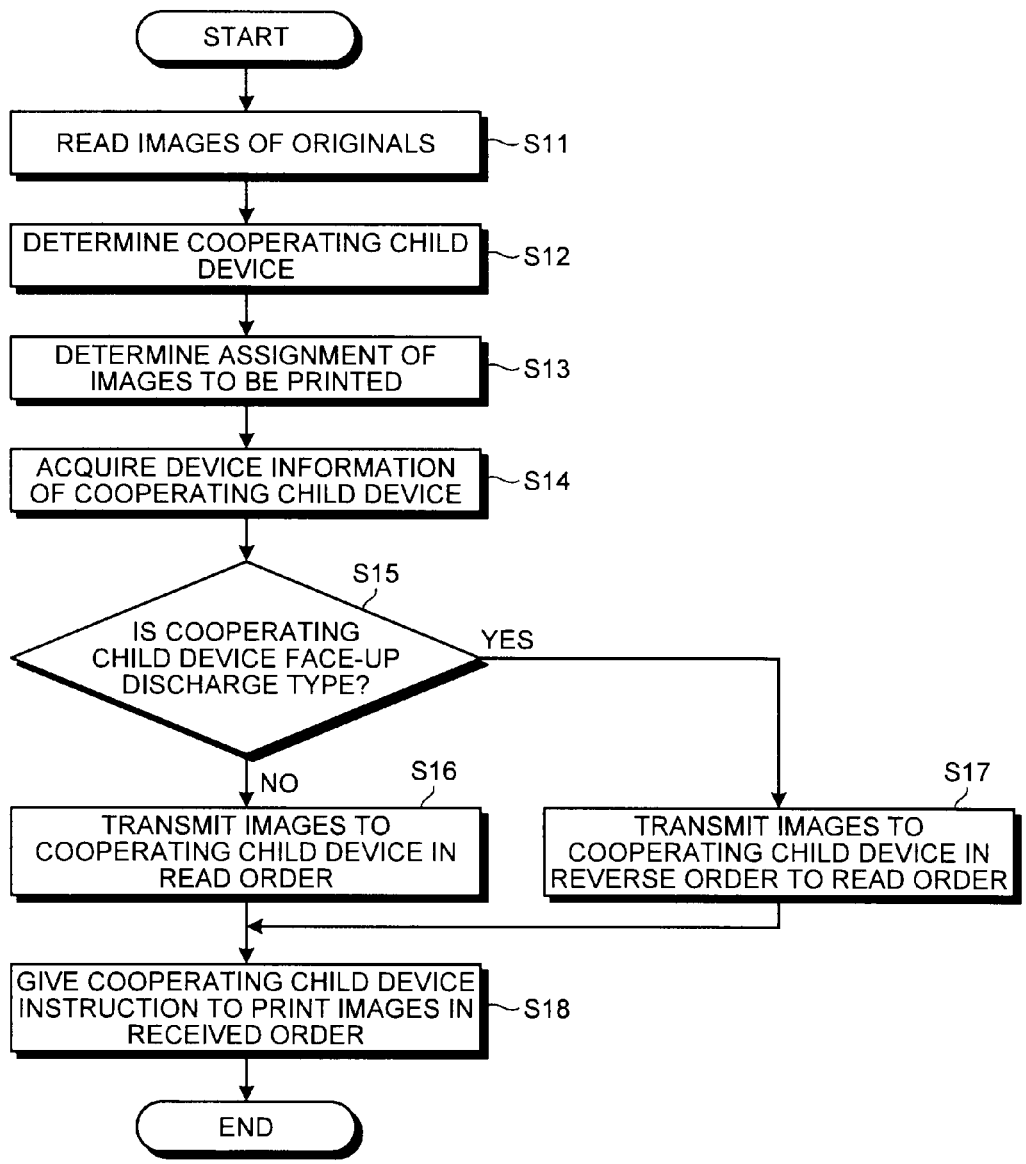
FIG. 3 is a flowchart showing a procedure of how the parent device outputs a print instruction to a cooperating child device.

Subsequently, a procedure of a distributed printing process performed by the parent device 100 and cooperating child device 200 configured as described above is explained. FIG. 2 is a flowchart showing a procedure of how the parent device 100 gives itself a print instruction and performs a printing process. FIG. 3 is a flowchart showing a procedure of how the parent device 100 outputs a print instruction to the cooperating child device 200.

First, as shown in FIG. 2, the reading unit 101 reads images of originals (Step S1). The transmission control unit 103 determines a cooperating child device 200 based on device information of the child devices 200 acquired by the acquiring unit 102 (Step S2). The transmission control unit 103 determines assignment of the images to be printed by the parent device 100 and the determined cooperating child device 200 (Step S3).

The acquiring unit 102 acquires device information of the parent device 100 from the storage unit 110 (Step S4). The print instructing unit 105 determines whether the parent device 100 is a face-up discharge type from the acquired device information (Step S5). When determining that the parent device 100 is not a face-up discharge type (NO at Step S5), the print instructing unit 105 transmits an instruction to print the images in the read order to the printing unit 106 (Step S6). On the other hand, when determining that the parent device 100 is a face-up discharge type (YES at Step S5), the print instructing unit 105 transmits an instruction to print the images in reverse order to the read order (Step S7).

The printing unit 106 prints out the images either in the read order or in reverse order to the read order in accordance with the print instruction received from the print instructing unit 105 (Step S8).

Subsequently, a procedure of how the parent device 100 outputs a print instruction to the cooperating child device 200 is explained with reference to FIG. 3. Incidentally, Steps S11 to S13 are identical to Steps S1 to S3 in the flowchart shown in FIG. 2.

As shown in FIG. 3, at Step s14, the acquiring unit 102 acquires the device information of the cooperating child device 200 from the cooperating child device 200. The transmission control unit 103 determines whether the cooperating child device 200 is a face-up discharge type (Step S15). When determining that the cooperating child device 200 is a face-up discharge type (YES at Step S15), the transmission control unit 103 transmits the images to the cooperating child device 200 in reverse order to the read order (Step S17). On the other hand, when determining that the cooperating child device 200 is not a face-up discharge type (NO at Step S15), the transmission control unit 103 transmits the images to the cooperating child device 200 in the read order (Step S16).

The print instructing unit 105 transmits an instruction to print the images in the order in which the cooperating child device 200 has received the images from the parent device 100 to the cooperating child device 200 (Step S18).

Figure 4:
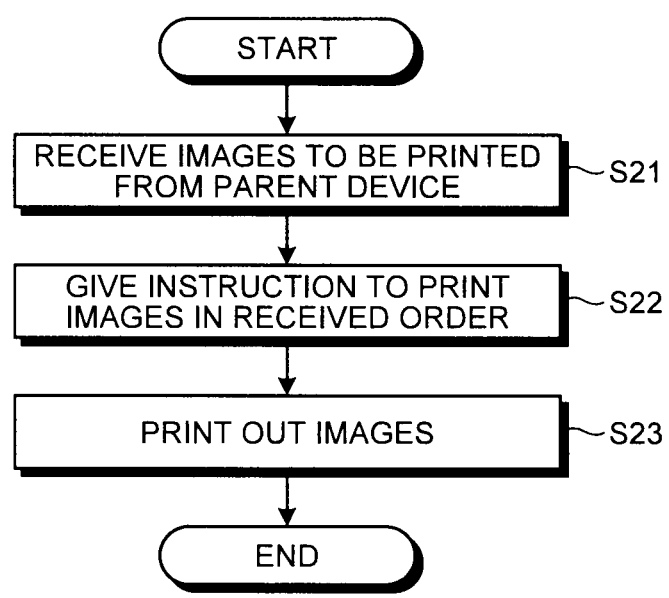
FIG. 4 is a flowchart showing a procedure of a printing process performed by the cooperating child device 200.

Subsequently, a procedure of a printing process performed by the cooperating child device 200 is explained. FIG. 4 is a flowchart showing the procedure of the printing process performed by the cooperating child device 200.

The reception control unit 203 receives images to be printed from the parent device 100 (Step S21). The print instructing unit 205 transmits an instruction to print the images in the order in which the reception control unit 203 has received the images from the parent device 100 to the printing unit 206 (Step S22). The printing unit 206 prints out the images in the order in which the reception control unit 203 has received the images from the parent device 100 in accordance with the instruction from the print instructing unit 205 (Step S23).

In this manner, according to the present embodiment, a direction of a printed sheet when discharged, i.e., either face up or face down is identified from device information of a cooperating child device, and the printing order is changed depending on the identified direction; therefore, even in a case of distributed printing with a plurality of different types of devices, a direction of printed sheets when discharged and the discharge order can be unified.

Second Embodiment

In the first embodiment, the parent device 100 changes the transmission order of images to be transmitted to a cooperating child device 200 depending on whether the cooperating child device 200 is a face-up discharge type or not based on device information of the cooperating child device 200. In a second embodiment, in addition, the printing order of images is determined depending on whether the cooperating child device 200 includes a duplex printing mechanism or not.

Figure 5:
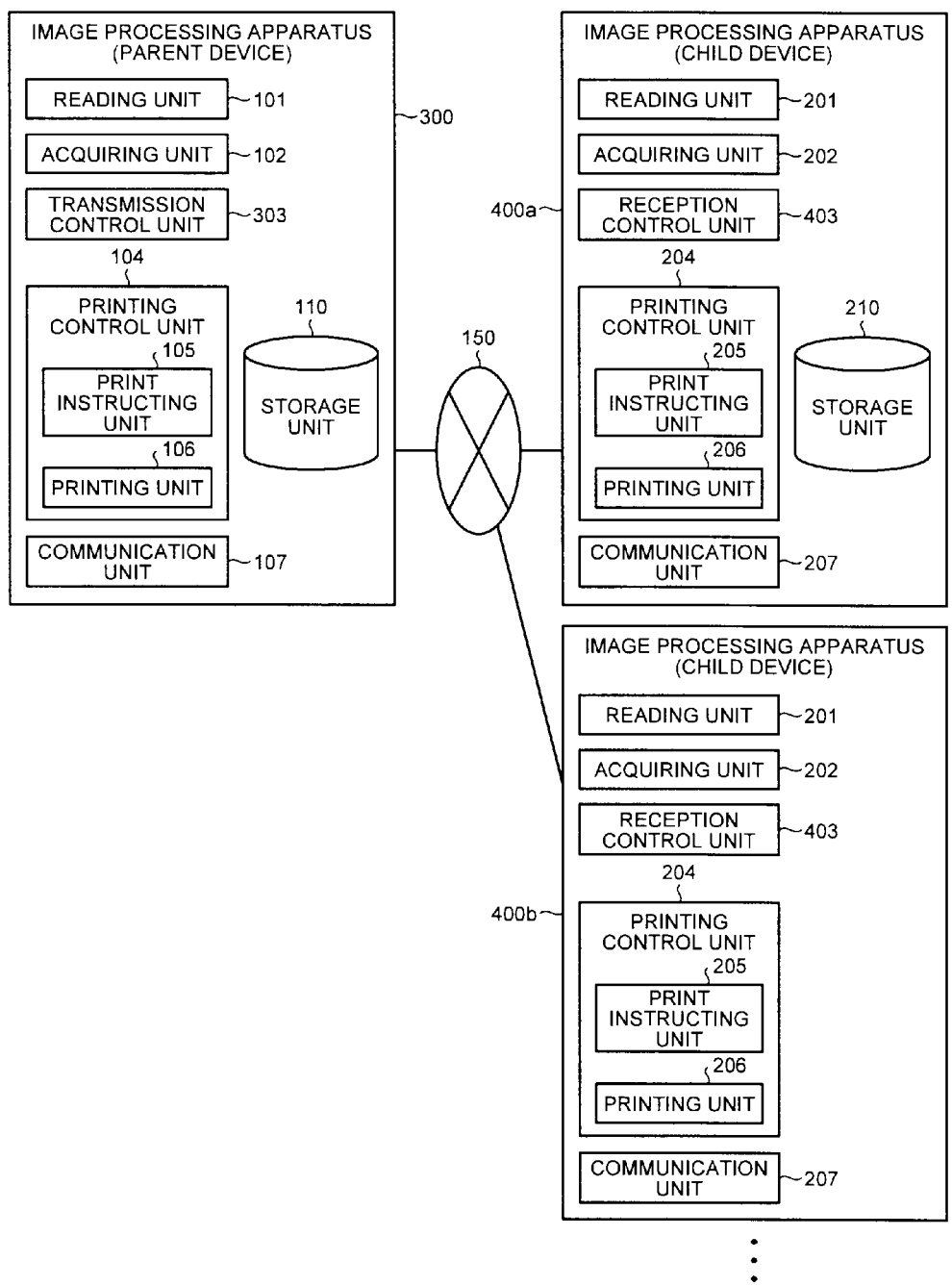
FIG. 5 is a block diagram showing an entire configuration and functions of an image processing system according to a second embodiment.

FIG. 5 is a block diagram showing an entire configuration and functions of an image processing system according to the second embodiment. As shown in FIG. 5, in the second embodiment, a parent device 300 is connected to child devices 400a and 400b (hereinafter, collectively referred to as "child device(s) 400" unless otherwise specified) via the communication device 150. Incidentally, in FIG. 5, two child devices 400 are illustrated; however, the number of child devices is not limited to two, and one or a plurality of child devices is connected to the parent device 300.

First, the parent device 300 mainly includes the reading unit 101, the acquiring unit 102, a transmission control unit 303, the printing control unit 104, the communication unit 107, and the storage unit 110. Incidentally, the units other than the transmission control unit 303 have the same function and configuration as those in the first embodiment.

The transmission control unit 303 transmits images read by the reading unit 101 to a cooperating child device 400 together with a print instruction according to device information of the cooperating child device 400 acquired by the acquiring unit 102. For example, the transmission control unit 303 transmits an instruction to print the images in the order in which the cooperating child device 400 receives the images from the parent device 300 to the cooperating child device 400. Furthermore, the transmission control unit 303 checks whether the cooperating child device 400 includes a duplex printing mechanism based on the device information, and when the transmission control unit 303 has confirmed that the cooperating child device 400 includes a duplex printing mechanism, the transmission control unit 303 includes an instruction to discharge printed sheets face down in the print instruction.

Then, the child device 400 mainly includes the reading unit 201, the acquiring unit 202, a reception control unit 403, the printing control unit 204, the communication unit 207, and the storage unit 210. Incidentally, the child device 400a shown in FIG. 5 includes the storage unit 210; however, the child device 400 does not have to include a storage unit like the child device 400b. Incidentally, the units other than the reception control unit 403 have the same function and configuration as those in the first embodiment.

The reception control unit 403 transmits images to be printed received from the parent device 300 to the printing unit 206, and transmits the received print instruction to the print instructing unit 205.

Figure 6:
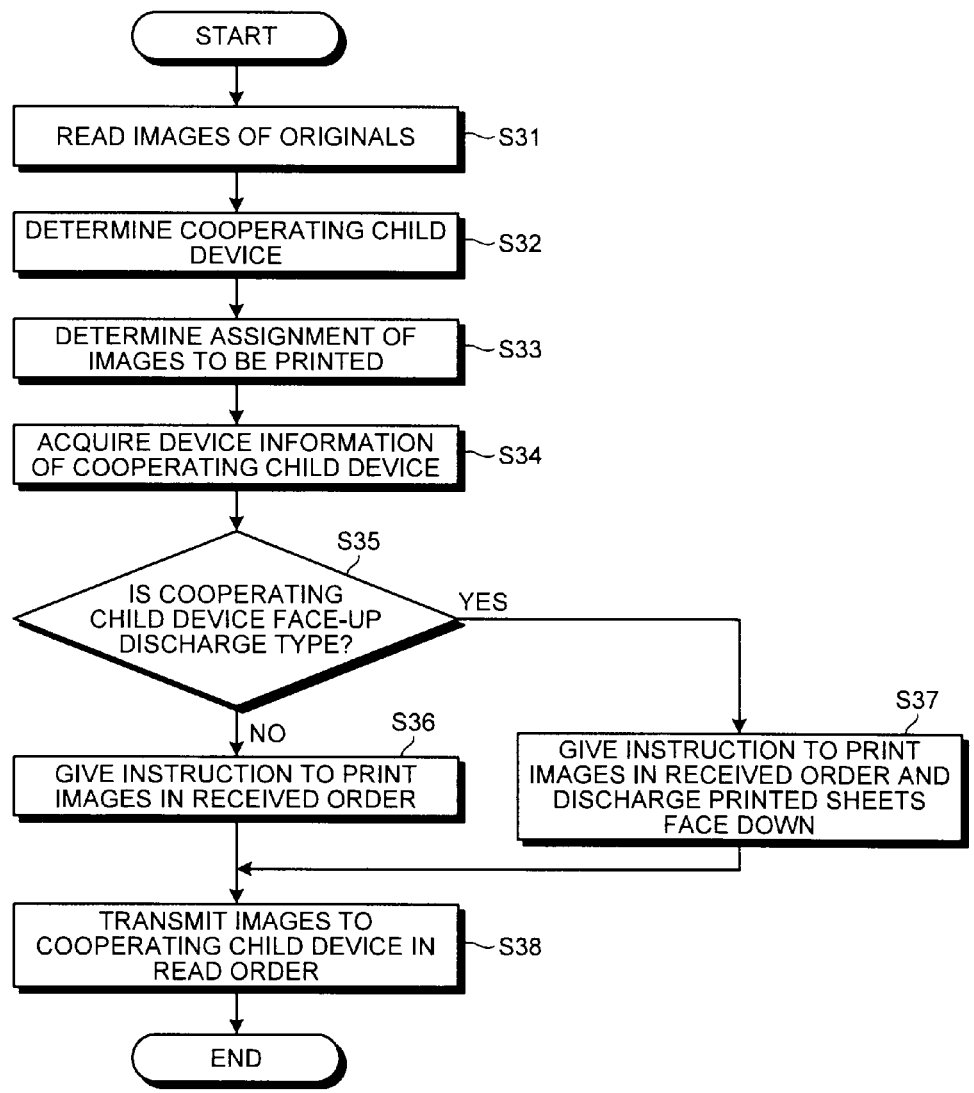
FIG. 6 is a flowchart showing a procedure of how a parent device outputs a print instruction to a cooperating child device.

Subsequently, a procedure of a distributed printing process performed by the parent device 300 and cooperating child device 400 configured as described above is explained. A procedure of how the parent device 300 gives itself a print instruction and performs a printing process is identical to that is described in the first embodiment with reference to the flowchart shown in FIG. 2. FIG. 6 is a flowchart showing a procedure of how the parent device 300 outputs a print instruction to the cooperating child device 400. Incidentally, processes at Steps S31 to S34 are identical to those at Steps S11 to S14 in the flowchart shown in FIG. 3.

At Step S35, when determining that the cooperating child device 400 is not a face-up discharge type (NO at Step S35), the transmission control unit 303 transmits an instruction to print images in the order in which the cooperating child device 400 receives the images from the parent device 300 to the cooperating child device 400 (Step S36). On the other hand, when determining that the cooperating child device 400 is a face-up discharge type (YES at Step S35), the transmission control unit 303 transmits an instruction to print images in the order in which the cooperating child device 400 receives the images from the parent device 300 and discharge printed sheets on which the images are printed face down to the cooperating child device 400 (Step S37).

The transmission control unit 303 transmits the images to the cooperating child device 400 in the order in which the images have been read by the reading unit 101 (Step S38).

Figure 7:
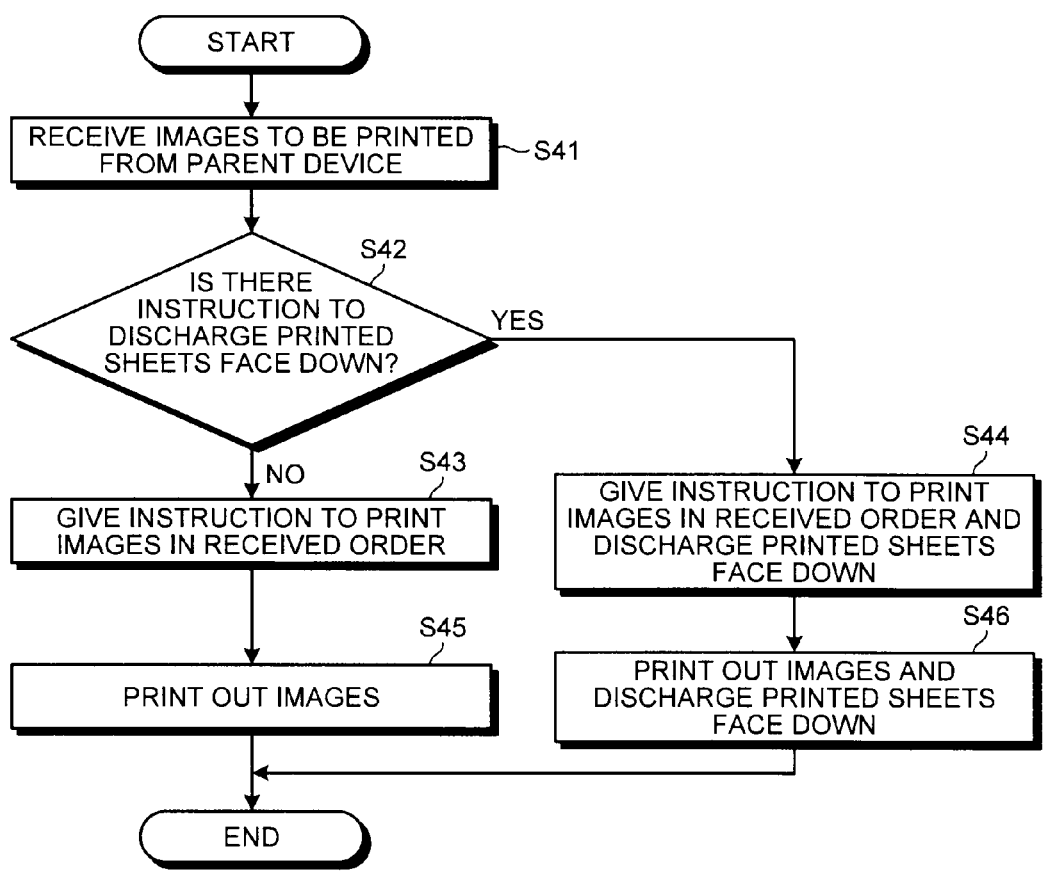
FIG. 7 is a flowchart showing a procedure of a printing process performed by the cooperating child device.

Subsequently, a procedure of a printing process performed by the cooperating child device 400 is explained. FIG. 7 is a flowchart showing the procedure of the printing process performed by the cooperating child device 400.

The reception control unit 403 receives images to be printed and a print instruction from the parent device 300 (Step S41). The print instructing unit 205 checks whether the reception control unit 403 has received an instruction to discharge printed sheets face down from the parent device 300 (Step S42).

When the print instructing unit 205 has confirmed that the reception control unit 403 has not received an instruction to discharge printed sheets face down from the parent device 300 (NO at Step S42), the print instructing unit 205 transmits an instruction to print the images in the order in which the reception control unit 403 has received the images from the parent device 300 to the printing unit 206 (Step S43). The printing unit 206 prints out the images in the received order in accordance with the instruction from the print instructing unit 205 (Step S45).

On the other hand, when the print instructing unit 205 has confirmed that the reception control unit 403 has received an instruction to discharge printed sheets face down from the parent device 300 (YES at Step S42), the print instructing unit 205 transmits an instruction to print the images in the order in which the reception control unit 403 has received the images from the parent device 300 and discharge printed sheets face down to the printing unit 206 (Step S44). The printing unit 206 prints out the images in the received order and discharges printed sheets face down in accordance with the instruction from the print instructing unit 205 (Step S46).

In this manner, according to the present embodiment, a direction of a printed sheet when discharged, i.e., either face up or face down and the presence or absence of a duplex printing mechanism are identified from device information of a cooperating child device, and the printing order is changed depending on the identified results; therefore, even in a case of distributed printing with a plurality of different types of devices, a direction of printed sheets when discharged and the discharge order can be unified.

Third Embodiment

In the first embodiment, the parent device 100 changes the transmission order of images to be transmitted to a cooperating child device 200 depending on whether the cooperating child device 200 is a face-up discharge type or not based on device information of the cooperating child device 200. In a third embodiment, in addition, based on the premise that the cooperating child device 200 includes an HDD, the printing order of images is determined depending on whether the cooperating child device 200 is a face-up discharge type or not.

Figure 8:
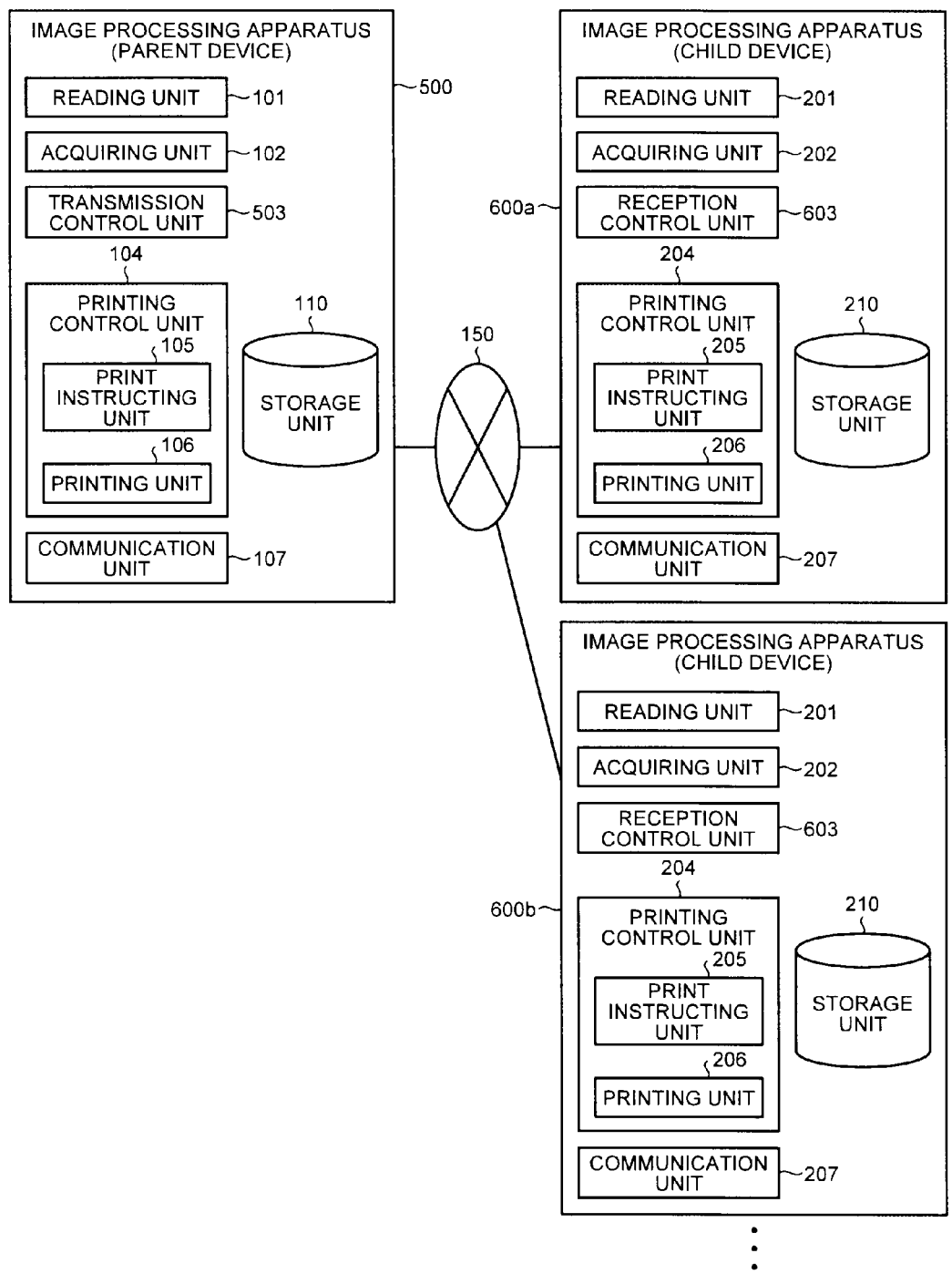
FIG. 8 is a block diagram showing an entire configuration and functions of an image processing system according to a third embodiment.

FIG. 8 is a block diagram showing an entire configuration and functions of an image processing system according to the third embodiment. As shown in FIG. 8, in the third embodiment, a parent device 500 is connected to child devices 600a and 600b (hereinafter, collectively referred to as "child device (s) 600" unless otherwise specified) via the communication device 150. Incidentally, in FIG. 8, two child devices 600 are illustrated; however, the number of child devices is not limited to two, and one or a plurality of child devices is connected to the parent device 500.

First, the parent device 500 mainly includes the reading unit 101, the acquiring unit 102, a transmission control unit 503, the printing control unit 104, the communication unit 107, and the storage unit 110. Incidentally, the units other than the transmission control unit 503 have the same function and configuration as those in the first embodiment.

The transmission control unit 503 transmits images read by the reading unit 101 to a cooperating child device 600 together with a print instruction according to device information of the cooperating child device 600 acquired by the acquiring unit 102. For example, when the cooperating child device 600 is a face-up discharge type, the transmission control unit 503 transmits an instruction to print the images in the order in which the cooperating child device 600 receives the images from the parent device 500 to the cooperating child device 600. On the other hand, when the cooperating child device 600 is a face-up discharge type, the transmission control unit 503 transmits an instruction to print the images in reverse order to the order in which the cooperating child device 600 receives the images from the parent device 500 to the cooperating child device 600.

Then, the child device 600 mainly includes the reading unit 201, the acquiring unit 202, a reception control unit 603, the printing control unit 204, the communication unit 207, and the storage unit 210. In the present embodiment, unlike the first and second embodiments, all the child devices include the storage unit 210 as shown in FIG. 8. Here, the storage unit 210 is a nonvolatile memory device such as an HDD. Incidentally, the units other than the reception control unit 603 have the same function and configuration as those in the first embodiment.

The reception control unit 603 receives images to be printed from the parent device 500, and stores the received images in the storage unit 210. Furthermore, the reception control unit 603 receives an instruction to print the images from the parent device 500, and transmits the received print instruction to the printing unit 206.

Figure 9:
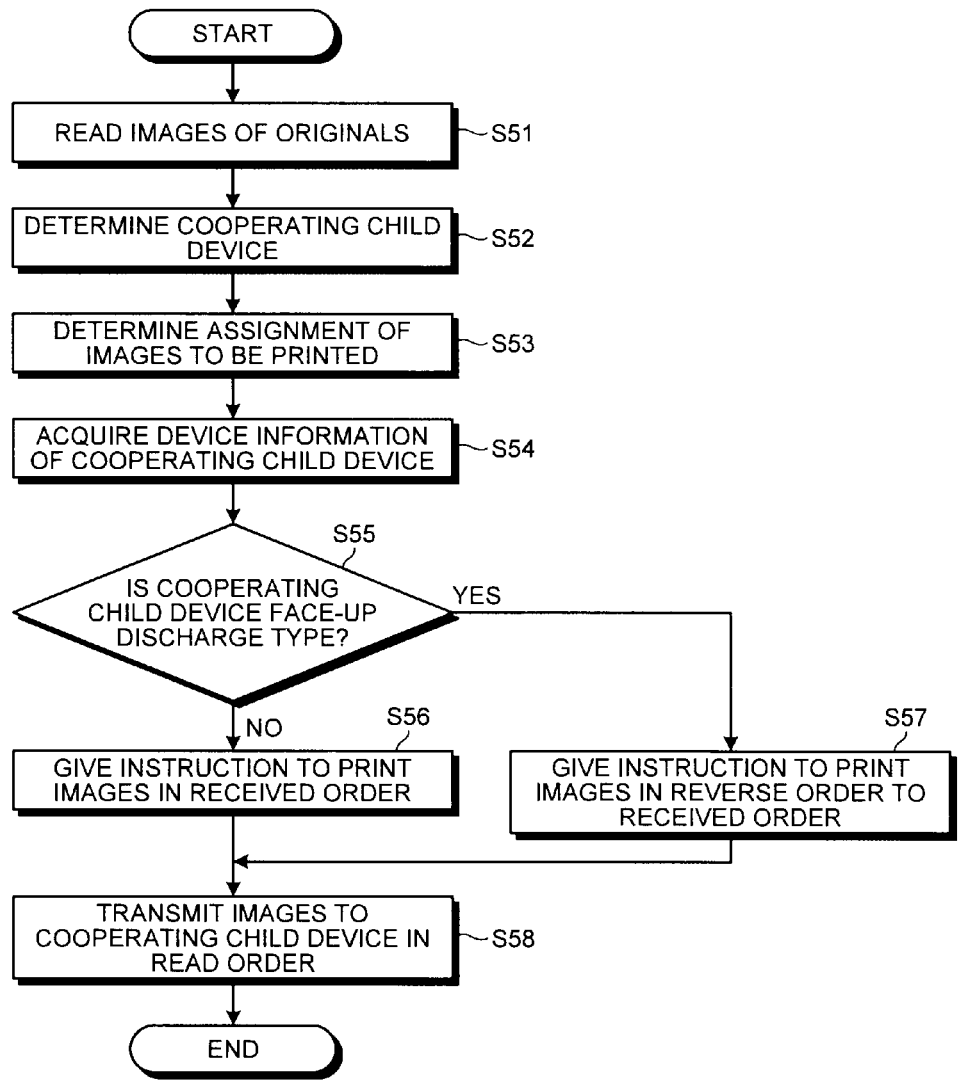
FIG. 9 is a flowchart showing a procedure of how a parent device outputs a print instruction to a cooperating child device.

Subsequently, a procedure of a distributed printing process performed by the parent device 500 and the cooperating child device 600 configured as described above is explained. A procedure of how the parent device 500 gives itself a print instruction and performs a printing process is identical to that is described in the first embodiment with reference to the flowchart shown in FIG. 2. FIG. 9 is a flowchart showing a procedure of how the parent device 500 outputs a print instruction to the cooperating child device 600. Incidentally, processes at Steps S51 to S54 are identical to those at Steps S11 to S14 in the flowchart shown in FIG. 3.

At Step S55, when determining that the cooperating child device 600 is not a face-up discharge type (NO at Step S55), the transmission control unit 503 transmits an instruction to print images in the order in which the cooperating child device 600 receives the images from the parent device 500 to the cooperating child device 600 (Step S56). On the other hand, when determining that the cooperating child device 600 is a face-up discharge type (YES at Step S55), the transmission control unit 503 transmits an instruction to print images in reverse order to the order in which the cooperating child device 600 receives the images from the parent device 500, i.e., from the last image received to the cooperating child device 600 (Step S57).

The transmission control unit 503 transmits the images to the cooperating child device 600 in the order in which the images have been read by the reading unit 101 (Step S58).

Figure 10:
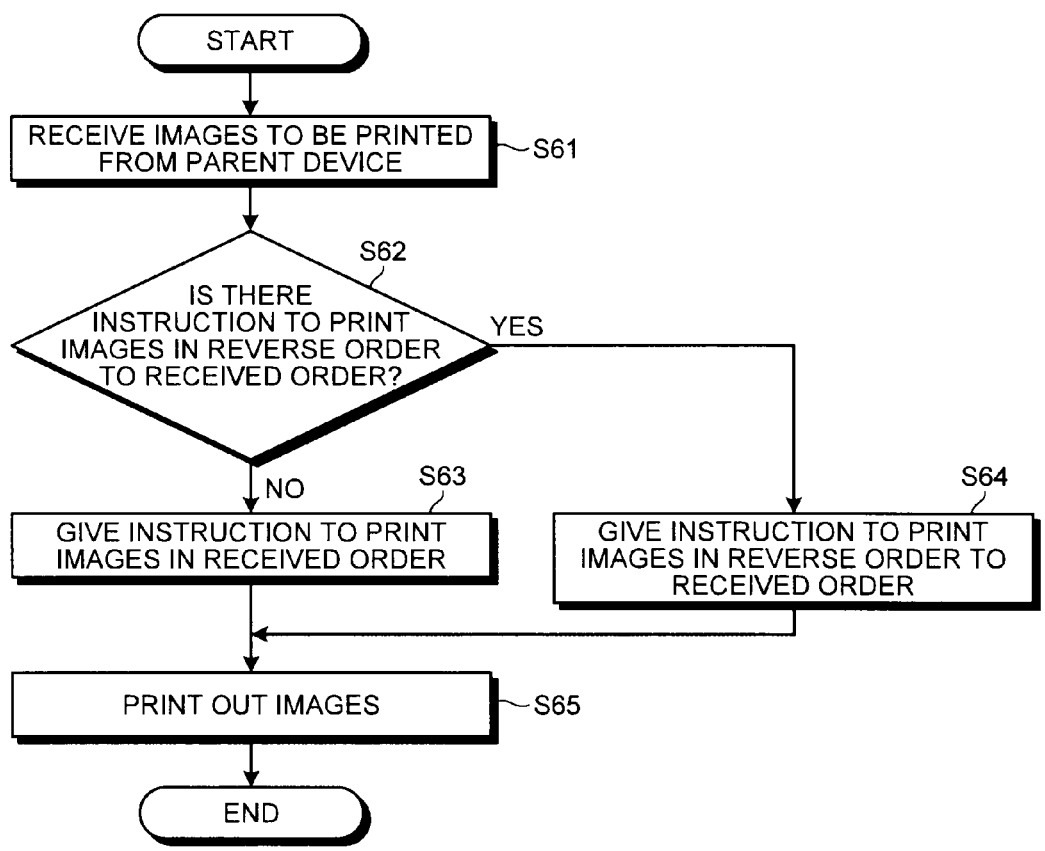
FIG. 10 is a flowchart showing a procedure of a printing process performed by the cooperating child device 600.

Subsequently, a procedure of a printing process performed by the cooperating child device 600 is explained. FIG. 10 is a flowchart showing the procedure of the printing process performed by the cooperating child device 600.

The reception control unit 603 receives images to be printed and a print instruction from the parent device 500 (Step S61). The print instructing unit 205 checks whether there is an instruction to print the images in reverse order to the order in which the reception control unit 603 has received the images from the parent device 500 (Step S62).

When the print instructing unit 205 has confirmed that the reception control unit 603 has not received an instruction to print the images in reverse order to the order in which the reception control unit 603 has received the images from the parent device 500 (NO at Step S62), the print instructing unit 205 transmits an instruction to print the images in the order in which the reception control unit 603 has received the images from the parent device 500 to the printing unit 206 (Step S63).

On the other hand, when the print instructing unit 205 has confirmed that the reception control unit 603 has received an instruction to print the images in reverse order to the order in which the reception control unit 603 has received the images from the parent device 500 (YES at Step S62), the print instructing unit 205 transmits an instruction to print the images in reverse order to the order in which the reception control unit 603 has received the images from the parent device 500 to the printing unit 206 (Step S64).

The printing unit 206 prints out the images in the received order or reverse order to the received order in accordance with the instruction from the print instructing unit 205 (Step S65).

In this manner, according to the present embodiment, a direction of a printed sheet when discharged, i.e., either face up or face down is identified from device information of a cooperating child device including a storage unit, and the printing order is changed depending on the identified result; therefore, even in a case of distributed printing with a plurality of different types of devices, a direction of printed sheets when discharged and the discharge order can be unified.

Fourth Embodiment

In the first to third embodiments, the printing order is determined with a focus on one configuration included in device information of a cooperating child device. In a fourth embodiment, the printing order is determined depending on a combination of a plurality of configurations included in device information of a cooperating child device.

Figure 11:
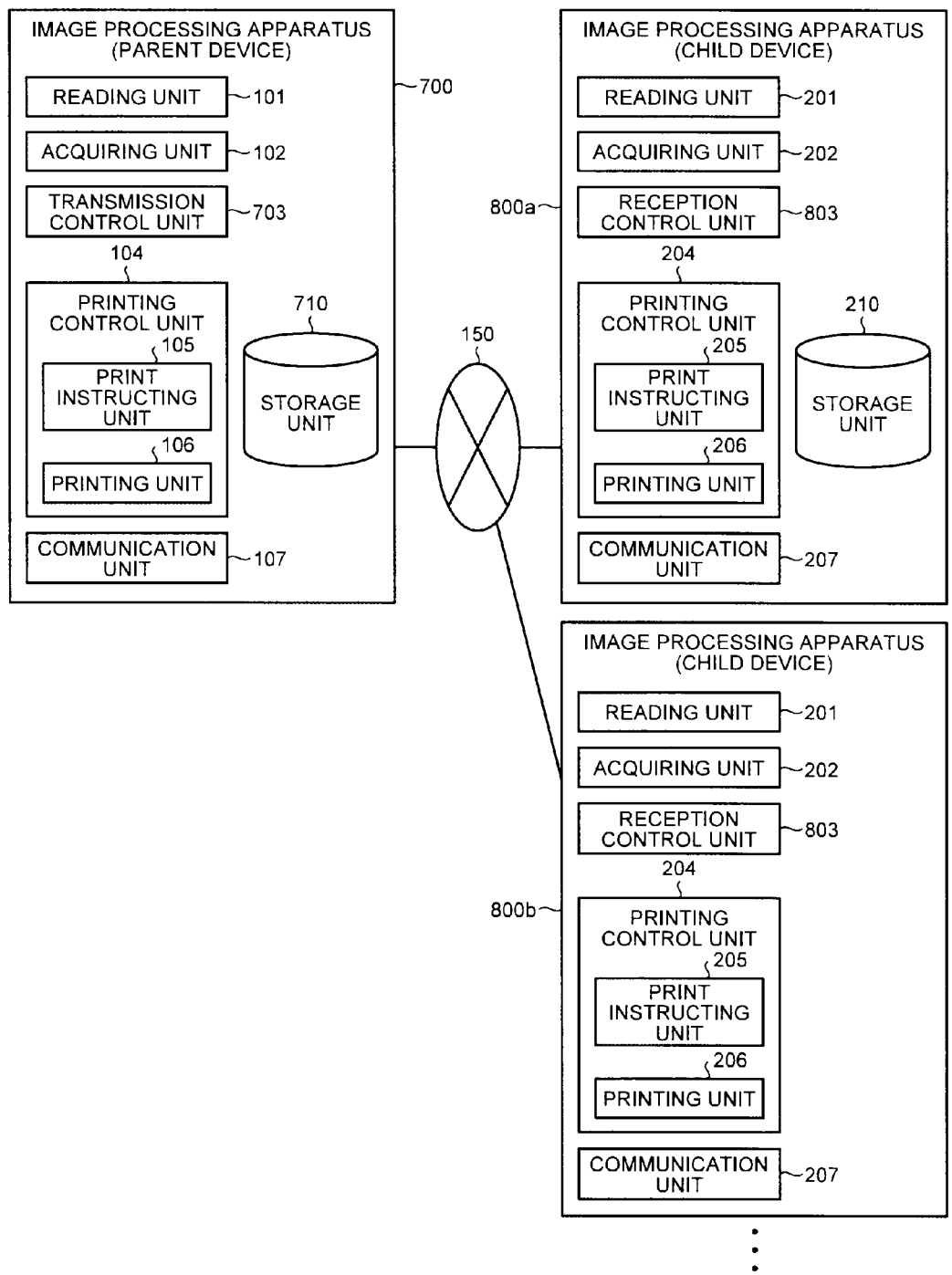
FIG. 11 is a block diagram showing an entire configuration and functions of an image processing system according to a fourth embodiment.

FIG. 11 is a block diagram showing an entire configuration and functions of an image processing system according to the fourth embodiment. As shown in FIG. 11, in the fourth embodiment, a parent device 700 is connected to child devices 800a and 800b (hereinafter, collectively referred to as "child device(s) 800" unless otherwise specified) via the communication device 150. Incidentally, in FIG. 11, two child devices 800 are illustrated; however, the number of child devices is not limited to two, and one or a plurality of child devices is connected to the parent device 700.

First, the parent device 700 mainly includes the reading unit 101, the acquiring unit 102, a transmission control unit 703, the printing control unit 104, the communication unit 107, and a storage unit 710. Incidentally, the units other than the transmission control unit 703 have the same function and configuration as those in the first embodiment.

The storage unit 710 stores therein a print instruction table. The print instruction table here means a table in which a combination of configurations of a cooperating child device 800 is associated with the transmission order and a print instruction.

FIG. 12 is a diagram showing an example of the print instruction table. As shown in FIG. 12, there are eight patterns (patterns No. 1 to 8) of combinations of configurations of the cooperating child device 800. The configurations include a discharge type, the presence or absence of an HDD, and the presence or absence of a duplex printing mechanism. The transmission order and print instruction include the image transmission order, the printing order, and the presence or absence of reversal by the duplex printing mechanism. Here, there are two discharge types—face-up discharge and face-down discharge. For example, in pattern No. 1, face-up discharge as a discharge type, the presence of an HDD, the presence of a duplex printing mechanism, the read order as the transmission order, the normal order as the printing order, and the presence of reversal by the duplex printing mechanism are indicated. The read order here means the order in which images are read by the reading unit 101, and the normal order here means the order in which the images are transmitted to the cooperating child device 800.

The transmission control unit 703 transmits images read by the reading unit 101 to the cooperating child device 800 together with a print instruction according to device information of the cooperating child device 800 acquired by the acquiring unit 102. Specifically, the transmission control unit 703 obtains a print instruction corresponding to information of the cooperating child device 800 acquired by the acquiring unit 102 from the print instruction table stored in the storage unit 710, and transmits the obtained print instruction to the cooperating child device 800.

Then, the child device 800 mainly includes the reading unit 201, the acquiring unit 202, a reception control unit 803, the printing control unit 204, the communication unit 207, and the storage unit 210. Incidentally, the child device 800a shown in FIG. 12 includes the storage unit 210; however, the child device 800 does not have to include a storage unit like the child device 800b. Incidentally, the units other than the reception control unit 803 have the same function and configuration as those in the first embodiment.

The reception control unit 803 transmits images to be printed received from the parent device 700 to the printing unit 206, and transmits a received print instruction to the print instructing unit 205.

Figure 13:
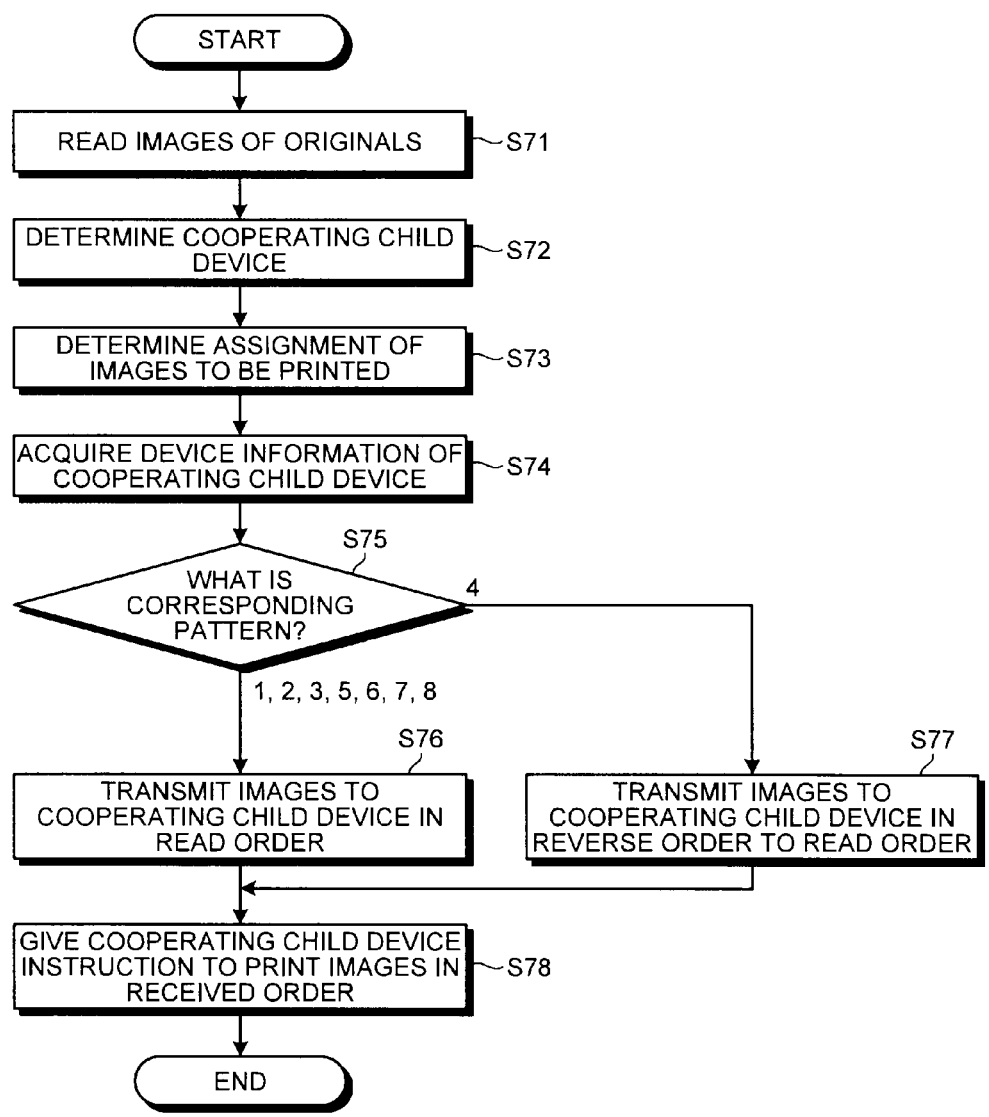
FIG. 13 is a flowchart showing a procedure of how a parent device outputs a print instruction to a cooperating child device.

Subsequently, a procedure of a distributed printing process performed by the parent device 700 and the cooperating child device 800 configured as described above is explained. A procedure of how the parent device 300 gives itself a print instruction and performs a printing process is identical to that is described in the first embodiment with reference to the flowchart shown in FIG. 2. FIG. 13 is a flowchart showing a procedure of how the parent device 700 outputs a print instruction to the cooperating child device 800. Incidentally, processes at Steps S71 to S74 are identical to those at Steps S11 to S14 in the flowchart shown in FIG. 3.

At Step S75, the transmission control unit 703 determines which pattern in the print instruction table the cooperating child device 800 corresponds to based on device information of the cooperating child device 800 (Step S75).

When determining that the cooperating child device 800 corresponds to any of patterns No. 1, 2, 3, 5, 6, 7, and 8 shown in FIG. 12 (Step S75: 1, 2, 3, 5, 6, 7, 8), the transmission control unit 703 transmits the images to the cooperating child device 800 in the read order (Step S76). On the other hand, when determining that the cooperating child device 800 corresponds to pattern No. 4 shown in FIG. 12 (Step S75: 4), the transmission control unit 703 transmits the images to the cooperating child device 800 in reverse order to the read order (Step S77). The transmission control unit 703 transmits an instruction to print the images in the received order to the cooperating child device 800 (Step S78).

Figure 14:
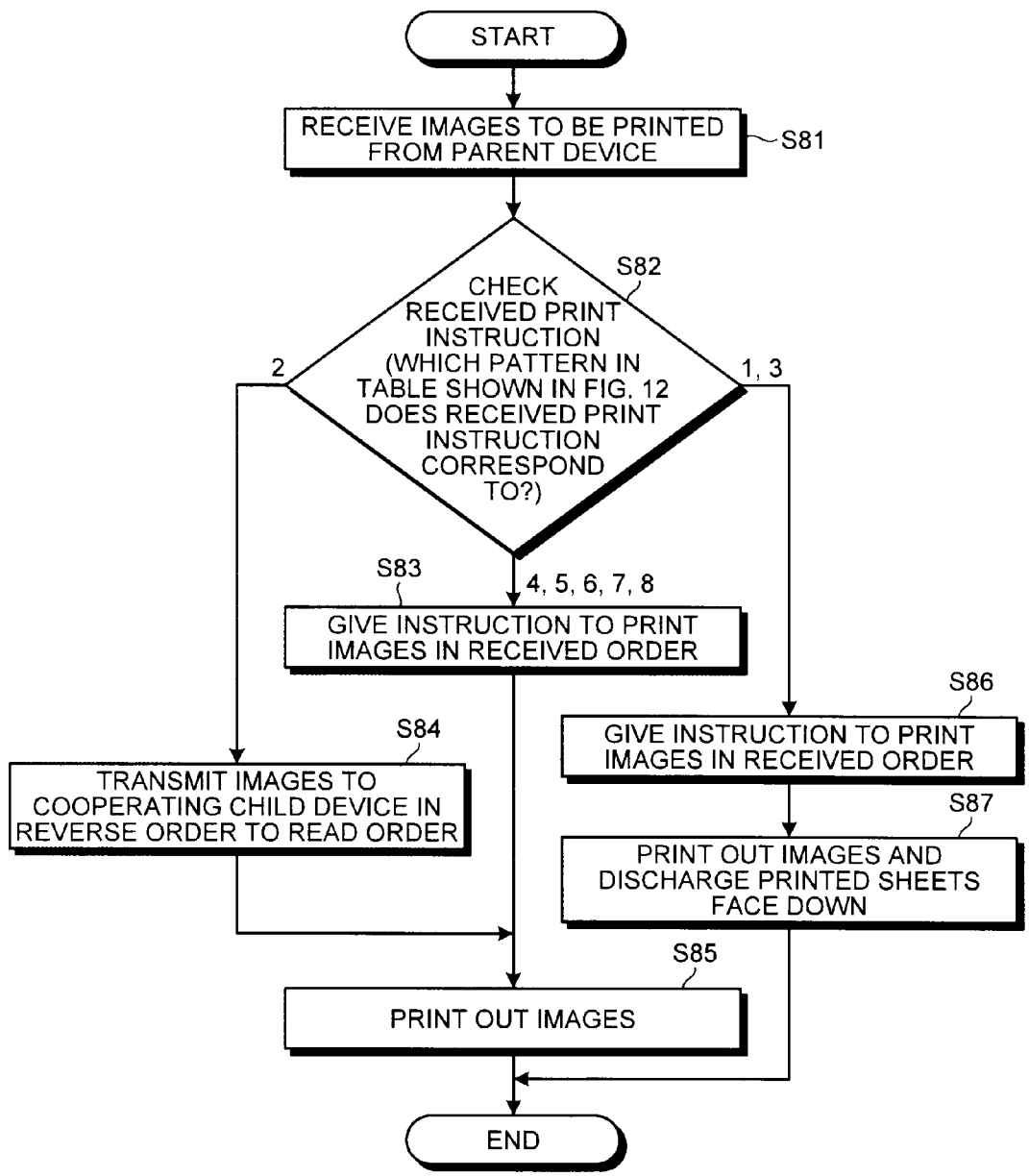
FIG. 14 is a flowchart showing a procedure of a printing process performed by the cooperating child device 800.

Subsequently, a procedure of a printing process performed by the cooperating child device 800 is explained. FIG. 14 is a flowchart showing the procedure of the printing process performed by the cooperating child device 800.

The reception control unit 803 receives images to be printed and a print instruction from the parent device 700 (Step S81). The print instructing unit 205 checks the print instruction received by the reception control unit 803 (Step S82).

When the print instructing unit 205 has confirmed that the print instruction received by the reception control unit 803 corresponds to any of patterns No. 4, 5, 6, 7, and 8 in the print instruction table shown in FIG. 12 (Step S82: 4, 5, 6, 7, 8), the print instructing unit 205 transmits an instruction to print the images in the received order to the printing unit 206 (Step S83). Furthermore, when the print instructing unit 205 has confirmed that the print instruction received by the reception control unit 803 corresponds to pattern No. 2 in the print instruction table shown in FIG. 12 (Step S82: 2), the print instructing unit 205 transmits an instruction to print the images in reverse order to the read order to the printing unit 206 (Step S84). The printing unit 206 prints out the images received by the reception control unit 803 in accordance with the print instruction (Step S85).

At Step S82, when the print instructing unit 205 has confirmed that the print instruction received by the reception control unit 803 corresponds to pattern No. 1 or 3 in the print instruction table shown in FIG. 12 (Step S82: 1, 3), the print instructing unit 205 transmits an instruction to print the images in the received order to the printing unit 206 (Step S86). The printing unit 206 prints out the received images and discharges printed sheets face down (Step S87).

In this manner, according to the present embodiment, the printing order is determined depending on a combination of a plurality of configurations included in device information of a cooperating child device; therefore, even in a case of distributed printing with a plurality of different types of devices, a direction of printed sheets when discharged and the discharge order can be unified while responding to diversity of cooperating child devices.

Figure 15:
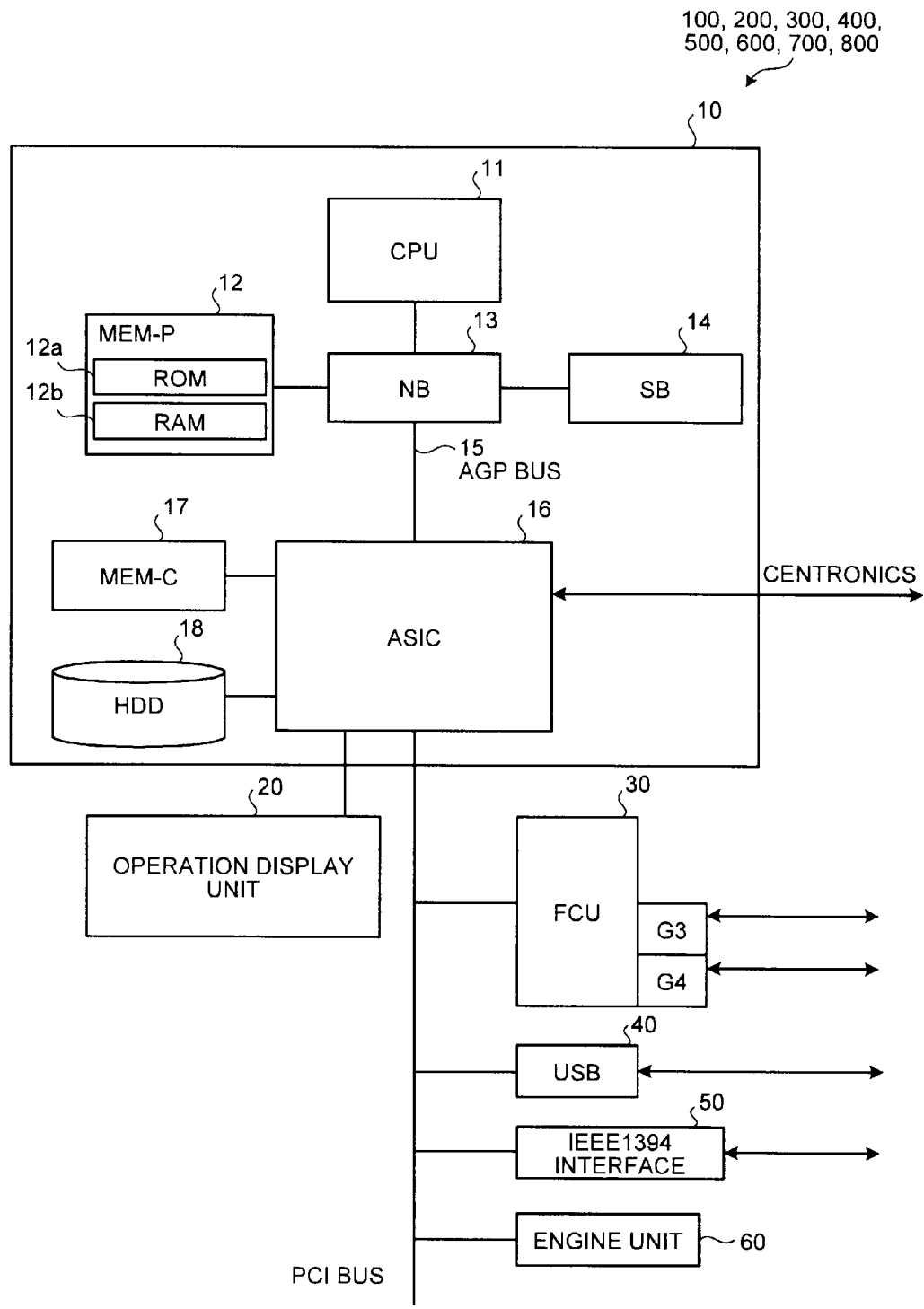
FIG. 15 is a block diagram showing a hardware configuration of the image processing apparatuses according to the first to fourth embodiments.

FIG. 15 is a block diagram showing a hardware configuration of the image processing apparatuses according to the first to fourth embodiments. As shown in FIG. 15, the image processing apparatuses 100, 200, 300, 400, 500, 600, 700, and 800 (hereinafter, referred to as the "MFP 100") include a controller 10 and an engine unit 60. The controller 10 and the engine unit 60 are connected by a PCI (Peripheral Component Interface) bus. The controller 10 is a controller which controls the entire MFP 100 and controls drawing, communications, and input from an operating unit (not shown). The engine unit 60 is such as a printer engine which can be connected to the PCI bus, and for example, the engine unit 60 is a black-and-white plotter, a 1-drum color plotter, a 4-drum color plotter, a scanner, or a fax unit, etc. Incidentally, the engine unit 60 includes an image processing part for performing error diffusion, gamma conversion, or the like in addition to the so-called engine part such as a plotter.

The controller 10 includes a CPU 11, a North Bridge (NB) 13, a system memory (MEM-P) 12, a South Bridge (SB) 14, a local memory (MEM-C) 17, an ASIC (Application Specific Integrated Circuit) 16, and a hard disk drive (HDD) 18. The NB 13 and the ASIC 16 are connected by an AGP (Accelerated Graphics Port) bus 15. The MEM-P 12 includes a ROM (Read Only Memory) 12a and a RAM (Random Access Memory) 12b.

The CPU 11 controls the entire MFP 100, and has a chipset composed of the NB 13, the MEM-P 12, and the SB 14. The CPU 11 is connected to other devices via the chipset.

The NB 13 is a bridge for connecting the CPU 11 to the MEM-P 12, the SB 14, and the AGP bus 15, and includes a memory controller for controlling read/write with respect to the MEM-P 12 and the like, a PCI master, and an AGP target.

The MEM-P 12 is a system memory used as a memory for storing a program or data, a memory for unpacking the program or data, a memory for drawing by a printer, and the like, and is composed of the ROM 12a and the RAM 12b. The ROM 12a is a read only memory used as a memory for storing a program or data. The RAM 12b is a read-write memory used as a memory for unpacking the program or data, a memory for drawing by a printer, and the like.

The SB 14 is a bridge for connecting the NB 13 to a PCI device and a peripheral device. The SB 14 is connected to the NB 13 via the PCI bus, and, for example, a network interface (I/F) is connected to the PCI bus. A network interface (I/F) unit and the like are connected to the PCI bus.

The ASIC 16 is an image processing IC (Integrated Circuit) including hardware components for image processing. The ASIC 16 serves as a bridge for connecting the AGP bus 15, the PCI bus, the HDD 18, and the MEM-C 17. The ASIC 16 is composed of a PCI target, an AGP master, an arbiter (ARB) which is the core of the ASIC 16, a memory controller for controlling the MEM-C 17, a plurality of DMACs (Direct Memory Access Controllers) for performing rotation of image data or the like by a hardware logic, and a PCI unit for performing data transfer between the controller 10 and the engine unit 60 via the PCI bus. An FCU (Facsimile Control Unit) 30, a USB (Universal Serial Bus) 40, and an IEEE 1394 (the Institute of Electrical and Electronics Engineers 1394) interface 50 are connected to the ASIC 16 via the PCI bus. An operation display unit 20 is directly connected to the ASIC 16.

The MEM-C 17 is a local memory used as a copy image buffer and a code buffer. The HDD 18 is a storage for storing therein image data, a program, font data, and a form.

The AGP bus 15 is a bus interface for a graphic accelerator card proposed to speed up a graphics operation, and accelerates the graphic accelerator card by directly accessing the MEM-P 12 at high throughput.

According to the present invention, in distributed printing by cooperation of a plurality of devices, even if the devices differ in type, a direction of printed sheets when discharged and the discharge order can be unified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus connected to one or a plurality of second image processing apparatuses, the image processing apparatus comprising:
    a reading unit that reads images of multiple pages of originals;
    an acquiring unit that acquires, as device information, from the one or the plurality of connected second image processing apparatuses, at least a discharge direction indicating either face-up discharge in which printed sheets are sequentially discharged with the printed side up or face-down discharge in which printed sheets are sequentially discharged with the printed side down, information on whether the one or the plurality of second image processing apparatuses includes a duplex printing mechanism for printing images on both sides of a sheet by reversing the sheet, and information on whether the one or the plurality of second image processing apparatuses includes a storage unit for storing transmitted images;
    a transmission control unit that determines a second image processing apparatus which takes charge of part of a printing process of the read images and images to be transmitted to the second image processing apparatus based on the acquired device information, and transmits the determined images to the determined second image processing apparatus;
    a printing control unit that determines printing order according to the acquired device information, and transmits an instruction to print the images in the determined printing order to the second image processing apparatus; and
    a storage unit storing a print instruction table, the print instruction table storing a plurality of combinations of the discharge direction, the information on whether the one or the plurality of second image processing apparatuses includes the duplex printing mechanism, and the information on whether the one or the plurality of second image processing apparatuses includes the storage unit each of the plurality of combinations stored in association with a predetermined image transmission order, a predetermined printing order, and a predetermined presence or absence of reversal by duplex printing mechanism, wherein
    the transmission control unit determines the images to be transmitted to the second image processing apparatus by referencing the print instruction table, and
    the printing control unit determines the printing order by referencing the print instruction table.

2. The image processing apparatus according to claim 1, wherein
    the printing control unit determines reverse order to read order in which the images are read by the reading unit as the printing order if the discharge direction is the face-up discharge or the read order as the printing order if the discharge direction is the face-down discharge.

3. The image processing apparatus according to claim 2, wherein
    the printing control unit determines the read order as the printing order if the information indicates that the second image processing apparatus includes the duplex printing mechanism, and transmits an instruction to discharge printed sheets reversed by the duplex printing mechanism as they are to the second image processing apparatus if the obtained discharge direction is the face-up discharge.

4. The image processing apparatus according to claim 2, wherein
    the printing control unit determines the read order as the printing order if the information indicates that the second image processing apparatus includes the storage unit, and transmits an instruction to change the printing order to the reverse order to the second image processing apparatus if the discharge direction is the face-up discharge.

5. The image processing apparatus according to claim 1, wherein
    the device information includes information on a print processing ability of the second image processing apparatus, and
    the printing control unit determines the number of images which the second image processing apparatus can take charge of printing thereof based on the information included in the acquired device information, and transmits the determined number of images to the second image processing apparatus.

6. An image processing system comprising a first image processing apparatus and one or a plurality of second image processing apparatuses which takes charge of part of a printing process of the first image processing apparatus, wherein the first image processing apparatus includes:
- a reading unit that reads images of multiple pages of originals;
- an acquiring unit that acquires, as device information, from the one or the plurality of connected second image processing apparatuses, at least a discharge direction indicating either face-up discharge in which printed sheets are sequentially discharged with the printed side up or face-down discharge in which printed sheets are sequentially discharged with the printed side down, information on whether the one or the plurality of second image processing apparatuses includes a duplex printing mechanism for printing images on both sides of a sheet by reversing the sheet, and information on whether the one or the plurality of second image processing apparatuses includes a storage unit for storing transmitted images;
- a transmission control unit that determines the second image processing apparatus which takes charge of part of a printing process of the read images and images to be transmitted to the second image processing apparatus based on the acquired device information, and transmits the determined images to the determined second image processing apparatus;
- a printing control unit that determines printing order according to the acquired device information, and transmits an instruction to print the images in the determined printing order to the second image processing apparatus; and
- a storage unit storing a print instruction table, the print instruction table storing a plurality of combinations of the discharge direction, the information on whether the one or the plurality of second image processing apparatuses includes the duplex printing mechanism, and the information on whether the one or the plurality of second image processing apparatuses includes the storage unit, each of the plurality of combinations stored in association with a predetermined image transmission order, a predetermined printing order, and a predetermined presence or absence of reversal by duplex printing mechanism, wherein
  the transmission control unit determines the images to be transmitted to the second image processing apparatus by referencing the print instruction table, and
  the printing control unit determines the printing order by referencing the print instruction table, and
the one or the plurality of second image processing apparatuses include:
- a reception control unit that receives the images and the instruction from the first image processing apparatus; and
- a printing unit that prints out the received images in accordance with the instruction.

7. A computer program product including a non-transitory computer-readable medium having computer-readable program codes for processing an image performed by an image processing apparatus connected to one or a plurality of second image processing apparatuses that includes a reading unit, an acquiring unit, a transmission control unit, and a printing control unit the program codes when executed causing the image processing apparatus to execute:
- reading, by the reading unit, images of multiple pages of originals;
- acquiring, by the acquiring unit, as device information, from the one or the plurality of connected second image processing apparatuses, at least a discharge direction indicating either face-up discharge in which printed sheets are sequentially discharged with the printed side up or face-down discharge in which printed sheets are sequentially discharged with the printed side down, information on whether the one or the plurality of second image processing apparatuses includes a duplex printing mechanism for printing images on both sides of a sheet by reversing the sheet, and information on whether the one or the plurality of second image processing apparatuses includes a storage unit for storing transmitted images;
- determining, by the transmission control unit, a second image processing apparatus which takes charge of part of a printing process of the read images and images to be transmitted to the second image processing apparatus based on the acquired device information, and transmitting, by the transmission control unit, the determined images to the determined second image processing apparatus; and
- determining, by the printing control unit, printing order according to the acquired device information, and transmitting, by the printing control unit, an instruction to print the images in the determined printing order to the second image processing apparatus, wherein
  the transmission control unit references a print instruction table to determine the images to be transmitted to the second image processing apparatus,
  the print control unit references the print instruction table to determine the printing order, and
  the print instruction table stores a plurality of combinations of the discharge direction, the information on whether the one or the plurality of second image processing apparatuses includes the duplex printing mechanism, and the information on whether the one or the plurality of second image processing apparatuses includes the storage unit, each of the plurality of combinations stored in association with a predetermined image transmission order, a predetermined printing order, and a predetermined presence or absence of reversal by duplex printing mechanism.

* * * * *